United States Patent [19] [11] 3,844,722
Tabara et al. [45] Oct. 29, 1974

[54] APPARATUS FOR THE CONTINUOUS PREPARATION OF A POLYMERIC SOLUTION

[75] Inventors: Yoshijiro Tabara; Hiroshi Akiyama; Shoji Sato, all of Otake; Seiji Miyata, Kuga; Kenichi Sakunaga, Otake, all of Japan

[73] Assignee: Mitsubishi Rayon Company Limited, Tokyo, Japan

[22] Filed: Sept. 8, 1972

[21] Appl. No.: 287,533

Related U.S. Application Data

[62] Division of Ser. No. 123,575, March 12, 1971, abandoned.

[30] Foreign Application Priority Data

Mar. 17, 1970 Japan................................ 45-21964

[52] U.S. Cl.............. 23/267 R, 23/271, 23/272.6 R
[51] Int. Cl............................................. B01d 11/02
[58] Field of Search 23/267 R, 271, 312 A, 272.6 R, 23/267 D, 272; 134/133, 182, 34, 36

[56] References Cited
UNITED STATES PATENTS

| 928,966 | 7/1909 | Hardesty | 23/272 |
|---|---|---|---|
| 1,857,630 | 5/1932 | Erickson | 23/271 |
| 2,055,836 | 9/1936 | Cowles | 23/271 |
| 2,573,949 | 11/1951 | Blizzard | 23/271 |
| 3,104,153 | 9/1963 | Ekegren | 23/271 |
| 3,129,064 | 4/1964 | Harvey | 23/271 |
| 3,290,122 | 12/1966 | Clinton | 23/271 M |
| 3,322,507 | 5/1967 | Smith | 23/271 |
| 3,343,919 | 9/1967 | Miller | 23/271 |
| 3,366,458 | 1/1968 | Jori | 23/312 A |
| 3,468,322 | 9/1969 | Katzer | 23/312 A |
| 3,606,093 | 9/1971 | Morse | 23/271 |
| 3,607,105 | 9/1971 | Reid | 23/271 |

FOREIGN PATENTS OR APPLICATIONS

| 642,417 | 10/1927 | France | 23/271 |
| 192,652 | 11/1964 | Sweden | 23/271 |

*Primary Examiner*—Wilbur L. Bascomb, Jr.
*Assistant Examiner*—S. J. Emery
*Attorney, Agent, or Firm*—Armstrong, Nikaido & Wegner

[57] ABSTRACT

A uniform solution of polymeric material such as acrylonitrile polymer in an organic solvent is prepared through the process wherein the polymeric material is mixed with solvent to make a slurry in a mixer, the slurry falls in a cascade from a slurry spout of the mixer into a uniting funnel along the axis line of the funnel and at the same time, a solution previously prepared from the above polymeric material and solution flows down along a converging inside surface of the funnel, the slurry and the solution are united at the bottom portion of the funnel so as to form a "core-in-sheath" type composite stream, and then the composite stream is heated with stirring in a dissolving means so as to be converted to a solution.

5 Claims, 1 Drawing Figure

PATENTED OCT 29 1974 3,844,722
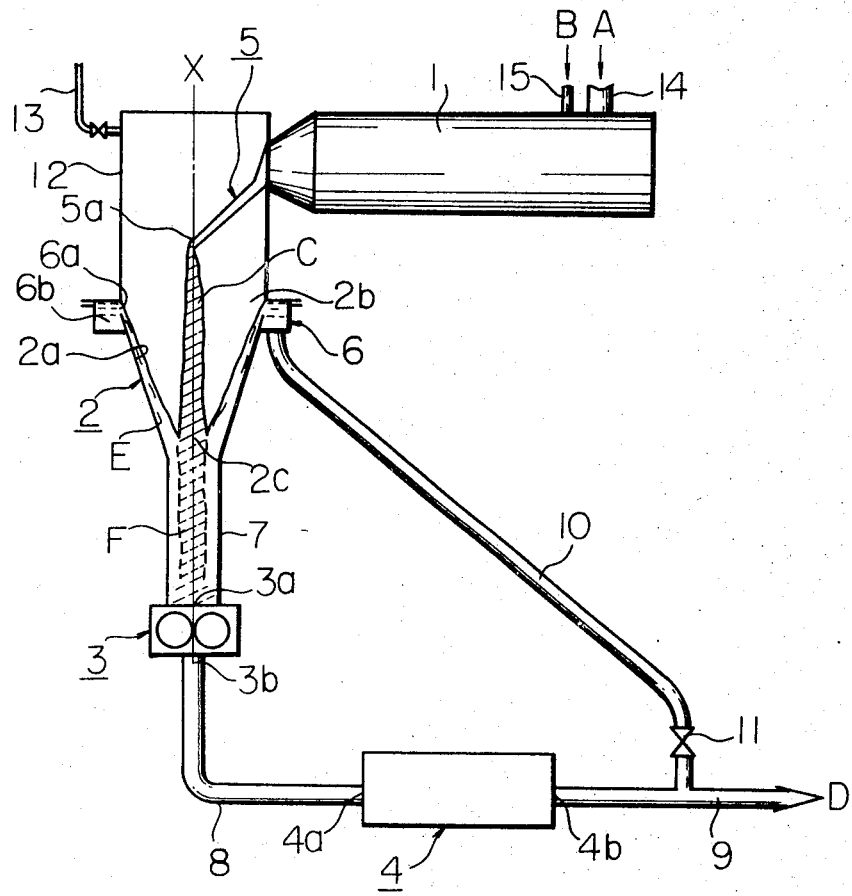

APPARATUS FOR THE CONTINUOUS PREPARATION OF A POLYMERIC SOLUTION

This is a division of application Ser. No. 123,575, filed Mar. 12, 1971, now abandoned.

The present invention relates to an improved process and apparatus for the continuous preparation of a polymeric solution in a solvent, more particularly relates to an improved process and apparatus for continuously preparing a solution of a polymeric material, especially, acrylonitrile polymer, in a solvent while preventing the solution from being mixed with air bubbles.

When a polymeric material such as an acrylonitrile polymer is dissolved into an organic solvent, for example dimethyl formamide, dimethyl acetamide or dimethyl sulfoxide, it is frequently found that a portion of polymeric material undesirably forms numerous grains suspended in the solvent causing difficulty in the preparation of the uniform solution. The grain formation, as stated above, is due to the fact that when lumps of mass or the polymeric material are dispersed in the solvent, the outer portion of the lumps or mass first contacts, the solvent and forms a gel layer wherein the polymeric material is dissolved in the solvent with a very high concentration. The highly concentrated gel layer formed thus acts as a barrier for the penetration of the solvent into the lumps or mass.

Accordingly, when such a solvent having a higher dissolving property, as demethyl formamide is used to dissolve acrylonitrile polymer, the polymer tends to form the gel-layer.

Once the grains have been formed in the solvent system, it is required to mechanically grind the grains, to heat the system to a fairly high temperature or to stir the system for a very long time, in order to completely dissolve the grains.

Therefore, the above-mentioned manners are undesirable for obtaining a uniform solution. Particularly, the heating of the solvent system to too high a temperature frequently causes a disadvantageous result in that the polymeric material, especially, acrylonitrile polymer, colors brown.

A certain prior art discloses a batch-wise process of uniformly and quickly dissolving a polymeric material, such as acrylonitrile polymers, in an organic solvent such as dimethyl formamide, without formation of grains. In this prior process, the polymeric material is mixed with an organic solvent with vigorous stirring at a temperature at which the polymeric material is never swollen or dissolved in the solvent, to make a slurry.

The slurry is heated to a high temperature sufficient for dissolving the polymeric material, whereby the slurry is converted to a uniform solution.

However, the above process has the following disadvantages or inconveniences:

1. productivity is low due to discontinuity of the process and limit on volume of the dissolving container,
2. operation is complicated and troublesome, and
3. resultant solutions vary in qualities from batch to batch.

In order to eliminate the above-mentioned disadvantages of the conventional batch-wise dissolving process, it has been proposed to utilize a mono-axial screw-type mixer for dissolving the polymeric material. The conventional screw-type mixer is advantageous for carrying out the dissolution process in a continuous manner, but has the following disadvantages. That is, (a) the slurry tends to condense to form lumps or mass, (b) air bubbles mix in the resultant solution, and (c) qualities of the resultant solution change with lapse of time.

Particularly, when the polymeric materials such as acrylonitrile polymers are maintained at a high temperature for a long period, it is frequently found that the polymeric material is undesirably colored as stated above, and that the viscosity of the resultant solution is considerably increased. Accordingly, in order to avoid the above disadvantages, it is required that the slurry be converted into a uniform solution in a time as short as possible without coagulation of the slurry and then the solution discharged from the mixer in a time as shorter as possible.

It is an object of the present invention to provide an improved process and apparatus for the continuous preparation of a uniform solution of a polymeric material in a solvent in a shorter time without mixing of air bubbles in the solution.

The above and other objects and advantages of the present invention will become more readily apparent by the following detailed description and accompanying drawing.

The accompanying drawing shows a partial, cross-sectional view of an embodiment of the apparatus of the present invention.

According to the process of the present invention, (a) a polymeric material is uniformly mixed with a solvent for the polymeric material at a temperature at which the polymeric material can not be swollen or dissolved in the solvent in order to form a uniform slurry, (b) the slurry is allowed to fall in at least one cascade, (c) at the same time, a solution of the polymeric material in the solvent is downwardly flowed in a form of a downwardly converging stream layer which surrounds and directs the slurry cascade, (d) the slurry cascade and the solution stream are united into a "core-in-sheath" type composite stream wherein at least one core of the slurry cascade is surrounded with a sheath of the solution stream, and then (e) the composite stream is heated with stirring at a temperature sufficient for dissolving the polymeric material in the solvent so as to be converted into a uniform stream of a solution of the polymeric material in the solvent.

The process of the present invention is characterized in that a slurry wherein a polymeric material is uniformly suspended in a solvent, is allowed to fall in at least one cascade, the slurry cascade is united with a solution of a polymeric material, which solution is in a form of a downwardly converging stream layer, and which stream layer surrounds the slurry cascade and directs thereto, into a "core-in-sheath" type composite stream, and then the composite stream is heated with stirring at a temperature sufficient for dissolving the polymeric material in the solvent so as to convert the composite stream to a uniform stream of a solution of the polymeric material in the solvent. By the characteristics of the present invention, the slurry can be fed to the heat-dissolving step without contacting the slurry with the inside wall surface of the mixing device, and thus is converted into a uniform solution without the mixing of air bubbles in a very short time. In this case, when a portion of the resultant solution, which is prepared from the slurry, is utilized for unification with the slurry, the concentration of the polymeric material in the resultant solution only very slightly changes with lapse of time.

The process of the present invention can be effected with high efficiency by utilizing the apparatus of the present invention. The apparatus according to the present invention comprises the following elements:

a. a uniting funnel which has a downwardly converging inside surface, an upper entrance having a large opening area and a bottom exit having a small opening area, b. a mixer for preparing a slurry from a polymeric material and a solvent, having a slurry spout positioned substantially just above the bottom opening of the uniting funnel, c. means for flowing a solution of the polymeric material in the solvent downwardly along the converging inside surface of the uniting funnel, which means is located at an upper portion of the uniting funnel and surrounds the slurry spout of the mixer, and d. means for dissolving the polymeric material in the slurry into said solvent, which means is connected to the bottom exit of the uniting funnel and has a heater means and a stirrer means.

The process and its features of the present invention will be explained in more detail with reference to the accompanying drawing which shows a preferable embodiment of the apparatus of the present invention.

Referring to the drawing, a mixer 1 effects the preparation of a uniform slurry from a polymeric material and a solvent for the polymeric material fed through respective inlets 14 and 15. It is preferable to utilize, as the mixer, a special multi-axial screw type mixer comprising a mixing and transferring means having at least two screws and a stirring means having special stirrers connected to the screws. A uniting funnel 2 has a downwardly converging inside surface 2a and an upper entrance 2b and a bottom exit 2c. The inside surface 2a downwardly converges towards an axis line X of the uniting funnel 2, as shown in the drawing. Accordingly, the upper entrance 2b has a large opening area whereas the bottom exit 2c has a small opening area. A solution supplying means 6 is located at the upper end of the inside surface. The solution supplying means 6 as shown in the drawing comprises an annular conduit 6b surrounding the upper end of the uniting funnel 2. A slit 6a for feeding the solution from the conduit 6b into the uniting funnel 2 therethrough, is continuously formed on the conduit 6b in an annular form. Accordingly, the solution supplied into the annular conduit 6b can flow down through the slit 6a on the inside surface 2a so as to form a stream layer E of the solution along the inside surface. The stream layer thus formed converges to the bottom exit 2c. The uniting funnel 2 may be provided with a heating jacket for heating the solution stream layer on the inside surface 2a. The mixer 1 is provided with a slurry supplying conduit 5 having a slurry spout 5a positioned substantially just above the bottom exit 2c, in other words, on the axis line X of the uniting funnel 2.

The slurry supplied from the mixer 1 into the conduit 5 falls towards the bottom exit 2c, in other words, substantially along the axis line X of the uniting funnel 2, through the slurry spout 5a in a cascade form C.

The slurry cascade C is united with the solution stream layer E at the bottom exit portion 2c of the uniting funnel 2 so as to form a "core-in-sheath" type composite stream F.

The bottom exit 2c is connected with an upper end of a cylindrical composite stream conduit 7 disposed substantially vertically.

A lower end of the composite stream conduit 7 is connected to an inlet 3a of a liquid quantitative transferring means 3. The liquid quantitative transferring means 3 effects the quantitative transferring of a high viscosity liquid and may be selected from quantitative gear pumps and snake pumps. An outlet 3b of the transferring means 3 is connected to an inlet 4a of a dissolving means 4 through a conduit 8. The dissolving means 4 is provided with a heater means and stirrer means for a high viscosity liquid and thus, can uniformly heat the viscous liquid with continuous stirring. The dissolving means 4 is preferably a screw-type heat-mixer and continuous heat-kneaders.

An outlet 4b of the dissolving means 4 is connected to a discharge conduit 9. Preferably, a recycle conduit 10 is branched out from the discharge conduit 9 through a valve 11 so as to connect the discharge conduit 9 to the solution conduit 6b therethrough. Accordingly, a portion of the solution passing through the discharge conduit 9 can be recycled into the solution conduit 6b through the valve 11 and conduit 10. The recycle quantity of the solution may be adjusted by controlling the valve 11.

The mixer 1 usable for the apparatus of the present invention may be selected from a wide range of various mixers so far as the mixer can prepare a uniform slurry from the polymeric material and the solvent, and quantitatively discharge the resultant slurry after a constant staying time of the mixture or slurry therein. If a portion of the resultant slurry stays in the mixer for too long a time, the slurry gelates and obstructs formation of a uniform slurry. The gel causes blockage of an outlet portion of the mixer. Accordingly, it is desirable that the mixer be selected from the multi-axial screw-type mixers, especially, the special multi-axial screw-type mixers having an enhanced stirring performance.

It is preferable that the upper entrance 2b of the uniting funnel 2 and the slurry spout 5a of the mixer 1 are closely housed in a housing. In the embodiment shown in the accompanying drawing, a housing 12 is disposed upon the uniting funnel 2 so as to house the upper entrance 2b and the slurry spout 5a. The housing 12 is provided with a conduit 13 through which a pressure in the uniting funnel 2 is reduced. The pressure reduction is effective for quickening the removal of air bubbles contained in the slurry and solution fed into the uniting funnel 2 and for preventing the resultant composite stream from mixing with air bubbles.

A preferable process of the present invention will be explained hereinafter with reference to the accompanying drawing.

A polymeric material, for example, an acrylonitrile polymer, and a solvent, for example, dimethyl formamide, which is previously cooled to a temperature at which the polymeric material can not be swollen or dissolved in the solvent, are fed into the mixer 1 through respective inlets 14 and 15 and mixed with one another into a uniform slurry C. If necessary, the mixture is cooled to the low temperature, as stated above, in the mixer 1. The resultant slurry is fed from the mixer 1 into the uniting funnel 2 through the slurry conduit 5 and the slurry spout 5a so as to form a cascade stream having a relatively lower viscosity. The feed of the slurry may be carried out so as to form only one cascade stream or two or more cascade streams. Also, the cascade of the slurry may be in a linear form or a curtain form so far as the slurry cascades towards a substantially center portion of the bottom exit 2c along the axial line X of the uniting funnel 2. Owing to the low viscosity of the slurry, the air bubbles contained in the slurry can be completely removed during cascading of the slurry. On the other hand, a solution D which is previously prepared from the polymeric material A and the solvent B, is fed from the solution conduit 6b into the uniting funnel 2 through the slit 6a. The fed solution D flows down towards the bottom exit 2c while forming a solution layer (hollow curtain stream) E on the converging inside surface 2a of the uniting funnel 2.

At the bottom exit portion 2c of the uniting funnel 2, the slurry cascade C and the solution layer stream E, which surrounds the slurry cascade C, contact one another and thus, are united into a "core-in-sheath" type composite stream F wherein a slurry stream is in a core position and the solution stream encloses the slurry stream core so as to form a sheath for the core. When the slurry adhered to the inside surface of the uniting funnel 2 or conduit 7, the slurry would gel and the gel aggregate with each other so as to grow into a large mass which obstructed the transferring of the composite stream. However, in the present invention the slurry never contacts the inside surfaces of the uniting funnel 2 or conduit 7. As a result, the uniting operation can be successively performed for a very long time under a stable condition with no difficulty.

The slit 6a shown in the accompanying drawing is a continuous annular slit. However, the solution may be fed through a plurality of feeding apertures formed on the conduit 6b.

In this case, since the inside surface 2a of the uniting funnel 2 converges downwardly, even when the solutions are allowed to flow down through the apertures in a form of independent linear streams, the solution streams are incorporated together with each other into a solution stream layer (hollow curtain stream) F at a lower portion of the inside surface 2a.

The composite stream F thus prepared is fed into the inlet 3a of the liquid quantitative transferring means 3, for example, a gear pump, through the conduit 7, considerably stirred therein, and then quantitatively transferred into the dissolving means 4 through the outlet 3b and the conduit 8.

During the above transferring step, the composite stream is converted to a slurry-solution mixture.

The slurry-solution mixture fed into the dissolving means 4 is heated to a suitable temperature for dissolving the polymeric material in the solvent while vigorously stirring in order to form a uniform polymer solution D. Preferably, a prescribed quantity of the resultant solution D is recycled to the solution supplying means 6 through the branched conduit 10 and the valve 11, and then fed to the uniting funnel 2 in order to unite with the slurry according to the manner as illustrated hereinbefore. By recycling a portion of the resultant solution to the uniting step, it becomes possible to avoid periodical changes of proportion of the polymeric material and the solvent in the resultant solution owing to changing of supply rates of these with the lapse of time, and thus, to uniformly prepare an even solution.

The largest portion of the resultant solution is discharged from the apparatus through the conduit 9 so as to be supplied to desired uses thereof.

Additionally, needless to say, the solution to be fed to the solution supplying means 6 is not restricted only to the resultant solution recycled from the dissolving means 4, but the solution previously prepared in a separate dissolving apparatus may be used for this purpose also.

The following examples are intended to merely illustrate the present invention in detail but not intended to limit the scope thereof.

Example 1

A powdered acrylonitrile polymer was dissolved into dimethyl formamide through the following process utilizing a dissolving apparatus as shown in the accompanying drawing.

The dissolving apparatus had the following configurations and performances. a. Mixer, which comprises a casing being composed of a mixing section having di-axial screw conveyors for mixing the polymer and the solvent while being transferred therethrough, a stirring section having a di-axial stirrer means for preparing the slurry, and a cooling means.

The casing had an external diameter of 77 mm. The two axes rotatable in the same direction as one another were located in parallel with a distance of 57 mm between the axes thereof. In the mixing section, the screw conveyors were provided with simple screw threads of a height of 20 mm and pitch of 30 mm, and had a length of 240 mm, respectively. In the stirring section, the stirrers were provided with stirrer paddles having an oval-like form and located at a pitch of 30 mm, and had a length of 300 mm, respectively. The stirrers had no liquid transferring function. b. Means for supplying the polymer into the mixer, which was table feeder-type quantitative feeder. c. Means for supplying the solvent into the mixer, which was a reciprocal piston-type quantitative pump with a pressure control tank. d. Slurry conduit for cascading the slurry, which had a length of 15 cm and a width of 5 cm. e. Uniting funnel; which had a circular lateral cross-section, a height of 277 mm, a converging angle of 60° with respect to a horizontal plane, an upper entrance internal diameter of 400 mm and a bottom exit internal diameter of 80 mm. f. Transferring means, which is a quantitative gear pump for high viscosity liquid. g. Dissolving means, which comprises a casing for defining a dissolving chamber, stirrer paddles which rotate in the dissolving chamber so as to shovel off the viscous liquid adhered to an inside surface of the dissolving chamber and a heating jacket.

The dissolution was carried out according to the following steps.

a. The powdered acrylonitrile polymer was fed into the mixer at a feeding rate of 834 g/min at room temperature.
b. The dimethyl formamide at a temperature of −15°C was fed into the mixer at a feeding rate of 2,144 g/min.
c. The mixer was driven at a rotation of 150 rpm and a temperature of −15°C.
d. The uniting funnel had a heating jacket.

A heating medium was circulated in the heating jacket so as to maintain the temperature of the inside surface at 50°C, a solution of the acrylonitrile polymer in dimethyl formamide at a temperature of 50°C was fed into the uniting funnel under a substantially atmospheric pressure.

e. The dissolving means was controlled so that the resultant solution could be adjusted to a temperature of 50°C.

f. A portion of the resultant solution was recycled into the solution supplying means at a flow rate of 600 g/min.

The result was a uniform and substantially colorless solution wherein air bubbles could not be seen with the naked eye. After allowing the solution to stand under atmospheric pressure for 30 minutes, about 20 to 30 air bubbles of 1 to 5 mm diameter were produced in 500 cc of the solution.

This shows the fact that the resultant solution merely contained a very small quantity of air.

Even after driving the above apparatus for a very long time, no slurry was adhered to the inside surface of the uniting funnel. Accordingly, no troubles occurred owing to a lack of slurry gelation and thus, the apparatus was driven under a stable and favorable condition for a very long time.

The resultant solution had a variation of polymer concentration ranging in ± 0.2% by weight.

For comparison, the solution was prepared only from the slurry without addition of the solution utilizing the same apparatus as that of the present example.

After driving for about 8 hours, the above controlled driving of the apparatus was stopped owing to formation of a considerable quantity of gel. The resultant comparison solution had a variation of the polymer concentration ranging in ±0.3% by weight.

Example 2

The procedure of Example 1 was repeated using the same apparatus as that of Example 1 except that the pressure in the uniting funnel was reduced to 350 mmHg.

The resultant solution was so uniform that it did not contain air bubbles and grain. Even after driving the apparatus for a very long time, no trouble owing to gelation of the slurry occurred. The resultant solution had a transparency higher than that of Example 1.

What we claim is:

1. An improved apparatus for continuously preparing a solution of a polymeric material in a solvent comprising:
    a. uniting funnel means having a downwardly converging inside surface, an upper entrance and a bottom exit,
    b. mixer means for preparing a slurry from a polymeric material and a solvent, having a slurry spout positioned substantially just above said bottom exit of said uniting funnel means,
    c. flow means located at an upper portion of said uniting funnel means and surrounding said slurry spout of said mixer for flowing a solution of said polymeric material in said solvent downwardly along said converging inside surface of said uniting funnel means wherein said uniting funnel means, said slurry spout, and said flow means are positioned relative to each other for forming a flow in said bottom exit comprising a core of said slurry and a sheath of said solution of said polymeric material in said solvent,
    d. dissolving means connected to said bottom opening of said uniting funnel means for receiving the core-in-shield flow and for dissolving said polymeric material into said solvent, and
    e. solution recycle means between said dissolving means and said solution flowing means, whereby a portion of the resultant solution in said dissolving means is recycled into said solution flowing means.

2. Apparatus as claimed in claim 1, wherein said solution flowing means has an annular conduit disposed along the upper end of said uniting funnel means and having an annular slit for flowing said solution therethrough.

3. Apparatus as claimed in claim 1, wherein said solution flowing means has an annular conduit disposed along the upper end of said uniting funnel means and having a plurality of apertures for flowing said solution therethrough.

4. Apparatus as claimed in claim 1, wherein said slurry spout of said mixer and said upper entrance of said uniting funnel means are closely housed within a housing.

5. Apparatus as claimed in claim 4, wherein said housing is connected to a conduit for discharging air in said housing.

* * * * *